(12) United States Patent
Payton

(10) Patent No.: US 11,669,900 B2
(45) Date of Patent: Jun. 6, 2023

(54) SYSTEM AND METHOD OF PROTECTING STOCK MARKET INVESTMENT

(71) Applicant: VectorVest, Inc., Akron, OH (US)

(72) Inventor: Donald S. Payton, Mooresville, NC (US)

(73) Assignee: VectorVest, Inc., Akron, OH (US)

(*) Notice: Subject to any disclaimer, the term of this patent is extended or adjusted under 35 U.S.C. 154(b) by 0 days.

(21) Appl. No.: 16/733,461

(22) Filed: Jan. 3, 2020

(65) Prior Publication Data
US 2020/0219190 A1    Jul. 9, 2020

Related U.S. Application Data

(60) Provisional application No. 62/788,449, filed on Jan. 4, 2019.

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC ................................ G06Q 40/04; G06Q 40/06
See application file for complete search history.

(56) References Cited

U.S. PATENT DOCUMENTS

| | | | |
|---|---|---|---|
| 7,136,899 B1 * | 11/2006 | Campailla | G06Q 40/00 709/217 |
| 2005/0044274 A1 * | 2/2005 | Deming | G06Q 40/04 709/200 |
| 2005/0278237 A1 * | 12/2005 | Dankovchik | G06Q 40/04 705/35 |
| 2005/0278242 A1 * | 12/2005 | Dankovchik | G06Q 40/04 705/37 |
| 2009/0006226 A1 * | 1/2009 | Crowder | G06Q 40/12 705/30 |
| 2012/0239599 A1 * | 9/2012 | Matsumoto | G06N 20/00 706/12 |
| 2014/0229358 A1 * | 8/2014 | Kelley | G06Q 40/04 705/37 |

FOREIGN PATENT DOCUMENTS

| | | | | |
|---|---|---|---|---|
| JP | 20110-70418 A | * | 4/2011 | G06F 17/60 |
| KR | 20100056435 A | * | 5/2010 | G06Q 30/06 |

OTHER PUBLICATIONS

Heller, Stan: Capture Profits with VictorVest's New Trading Stop, Profitlocker Pro, for Canadian Shares, Jan. 30, 2019, pp. 1-5 (Year: 2019).*
VictorVest: ProfitLocker Pro—VictorVest, Jan. 2, 2019, You Tube Video, https://www.youtube.com/watch?v=z1jYnTXe-oA (Year: 2019).*

(Continued)

*Primary Examiner* — Bijendra K Shrestha
(74) *Attorney, Agent, or Firm* — Breiner & Breiner, L.L.C.

(57) ABSTRACT

There is disclosed a system and method for protecting stock market investments. The method allows a user to determine the level of risk to be taken throughout a trade as it nears a profit target and beyond. The system and method allows the user to set a stop price and to monitor the stop price of a stock, including in real time.

10 Claims, 17 Drawing Sheets

(56) References Cited

OTHER PUBLICATIONS

Loonielover: Trailing Stops: Using a Tatchet Effect to Advantage, Apr. 23, 2014, General Finance, Investing Strategies, Stocks, pp. 1-3 (Year: 2014).*
DiLiddo, Bart: Stocks, Strategies & Common Sense, 2015, Victor Vest, pp. 1-76 (Year: 2015).*
Loonielover:Trailing Stops: Using a Ratchet Effect to Advantage, Apr. 23, 2014, General Finance, Investing Strategies,Stocks, pp. 1-3(Year:2014)pp. 1-3 (Year: 2014).*
Krisburg, M.: A Flexible Trailing Stop, Jul. 15, 2018, pp. 1-9 (Year: 2018).*

* cited by examiner

Stop

ProfitLocker ⌄

This is an intelligent stop that locks in profits by adjusting itself to the action of the price and the inputs you select. Set the Target % to reflect your profit objective. Set the Stop % to reflect your maximum risk.

Target: ▼ ▲ 50.0% ▼ ▲
Stop: ▼ ▲ 15.0% ▼ ▲

☑ Simulate intraday stops (what does this mean?)

(Prior Art)
FIG. 1A

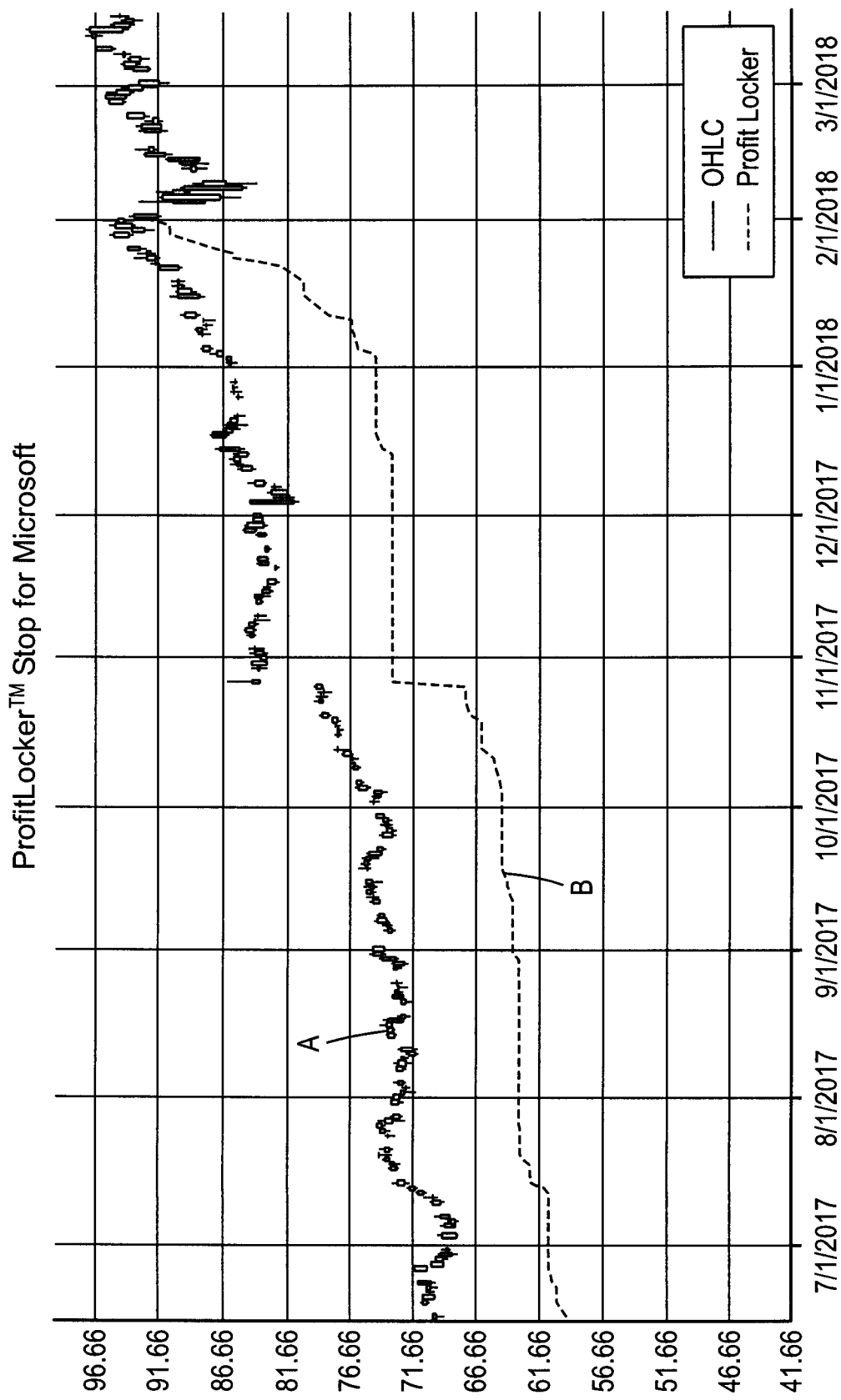

ProfitLocker™

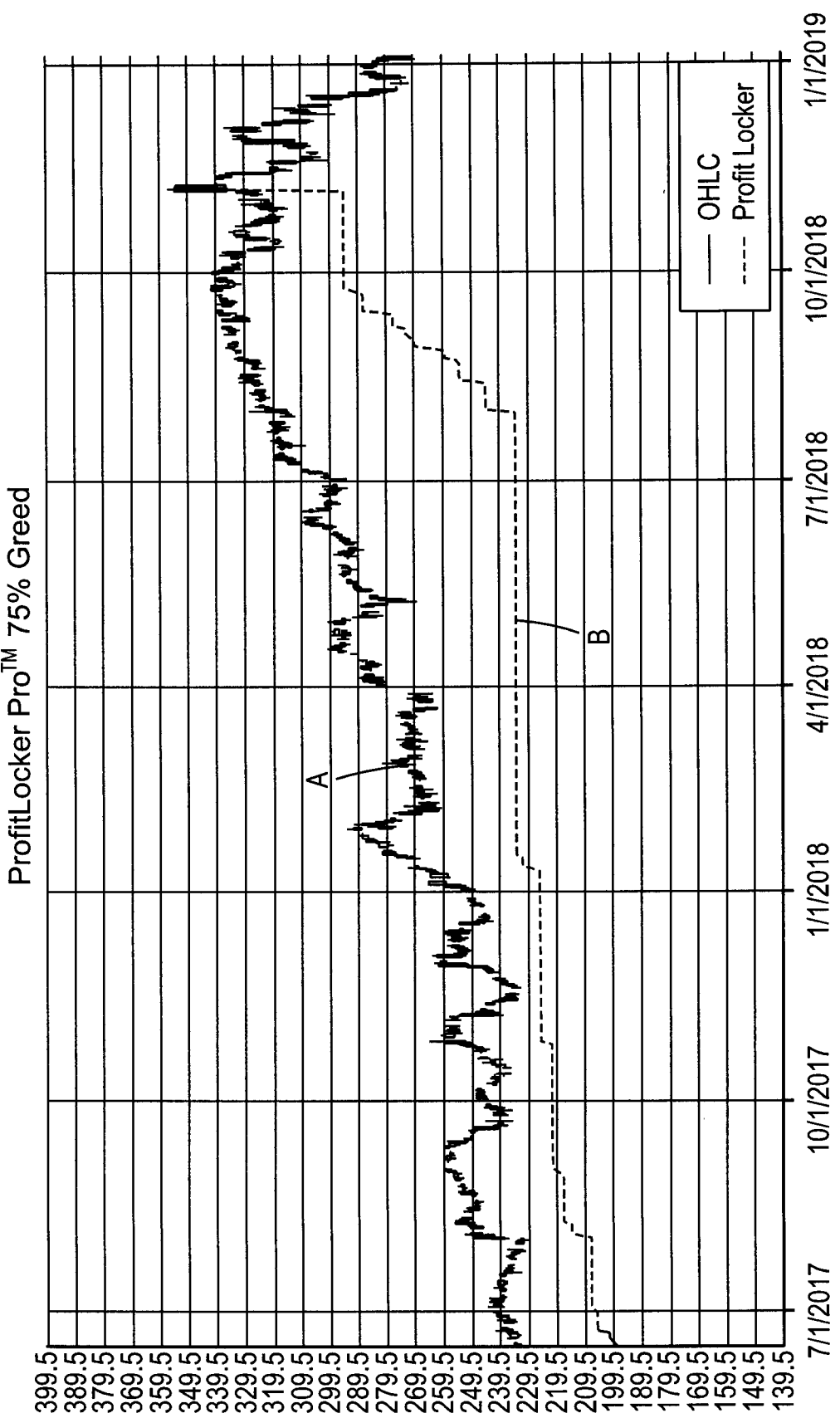

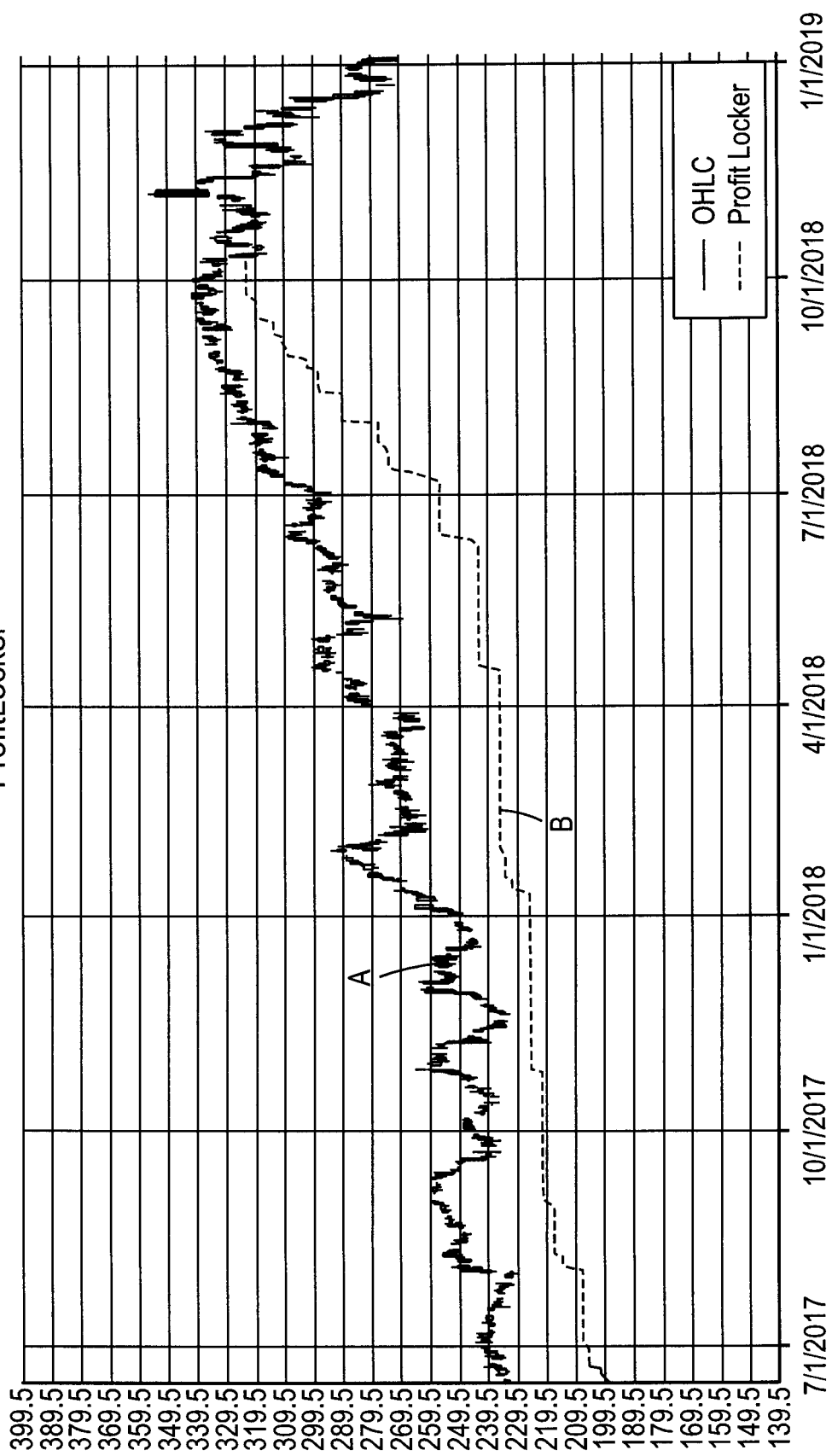

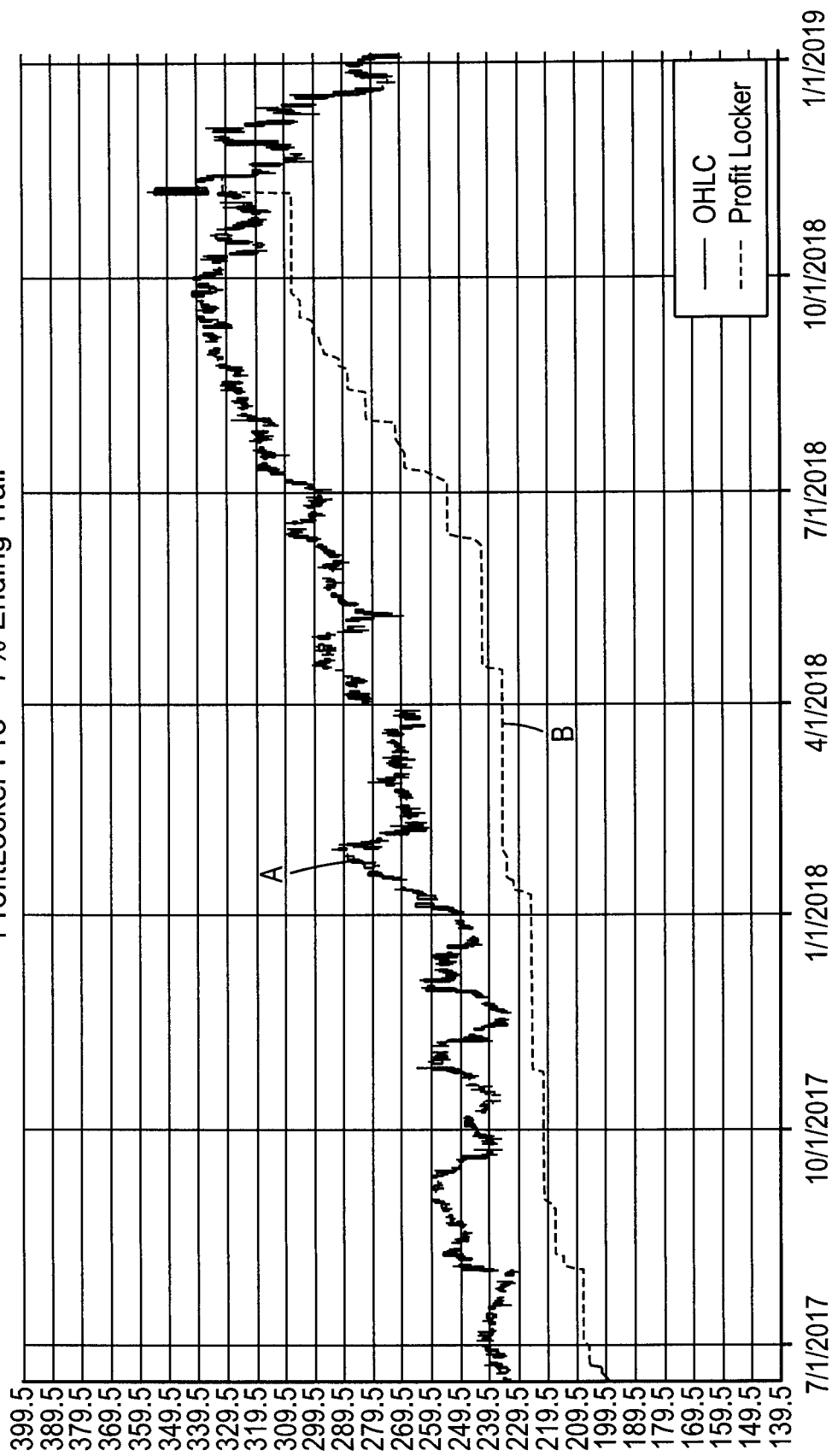

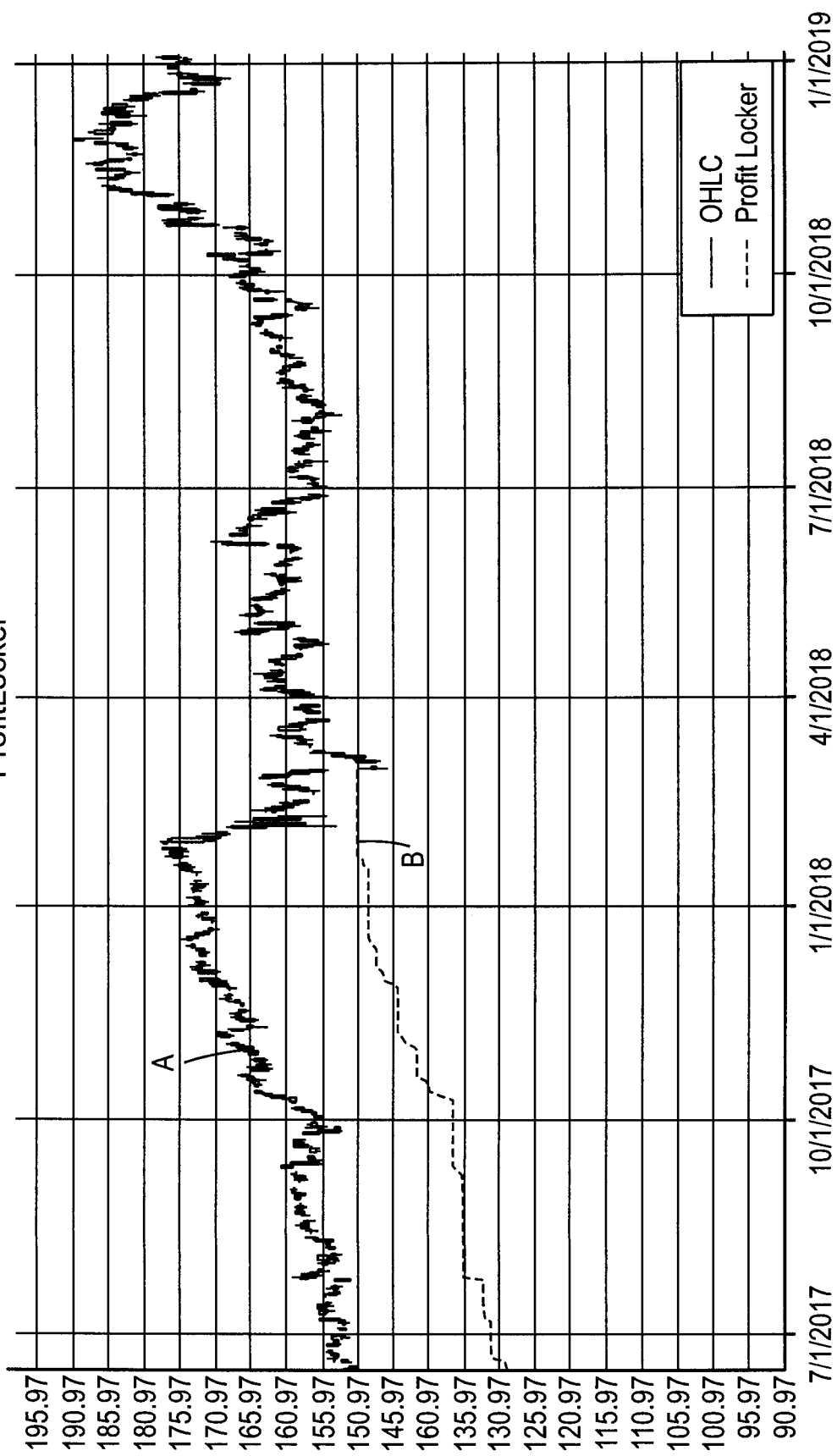

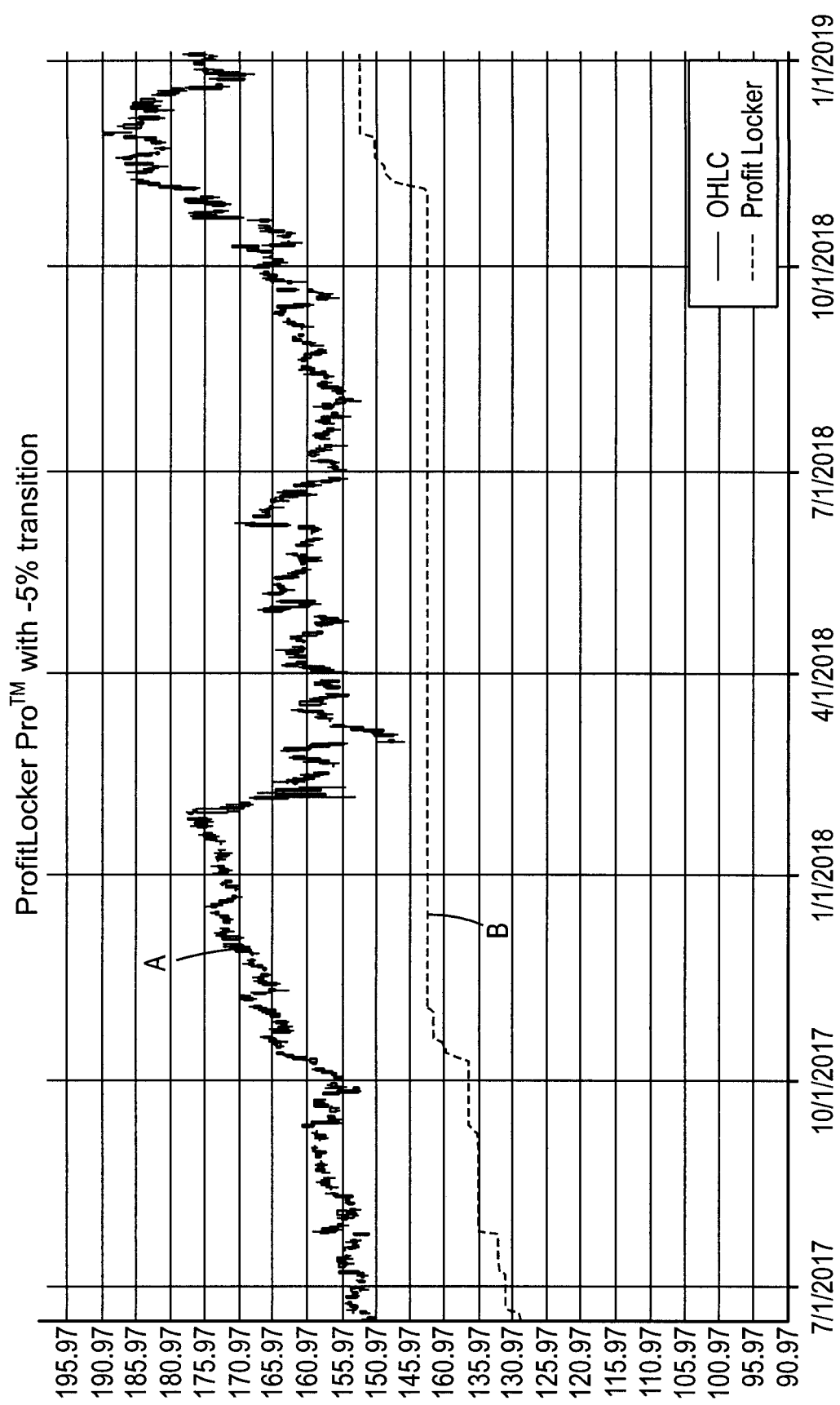

SYSTEM AND METHOD OF PROTECTING STOCK MARKET INVESTMENT

This application claims benefit of U.S. Provisional Application Ser. No. 62/788,449, filed Jan. 4, 2019, entitled "Method Of Protecting Stock Market Investments," and incorporated herein by reference in its entirety.

FIELD OF THE INVENTION

The present invention relates to a system and method for protecting stock market investments. The system and method allows users to determine the level of risk to be taken throughout a trade as it nears a profit target and beyond. More specifically, the system and method allows the user to set a stop price and to monitor the stop price of a stock, including in real time.

BACKGROUND OF THE INVENTION

There is a need by investors for a system and method for protecting stock market investments. Existing systems do not allow for the variations of stop losses or the automatic tightening and loosening of a stop on a stock investment.

One product on the market is ProfitLocker™ distributed by VectorVest® of Akron, Ohio. The ProfitLocker™ product has provided a very good system for determining when to close a stock market position. The system automatically sets a stop price ("stop" and "stop price" are used interchangeably herein), which if the stock's price falls below this stop price, the stock should be sold. The ProfitLocker™ system stop tracks a stock's price movement, and as that stock increases in price will either increase the user stop price, or in some cases keep it the same, to let the user know when it is time to close a position. The ProfitLocker™ product is driven by two user-defined variables, namely, Target % and Stop %. When the user first applies a ProfitLocker™ system stop, the system will set a stop price at a "Stop %" below the current stock price selected by the user, e.g. 15% below the stock purchase price. As the stock's price increases towards the Target %, i.e. a price above the stock purchase price selected by the user, the ProfitLocker™ system will automatically adjust the stop price. The system will keep the stop price at the Stop % below the highest price the stock has reached since the stop was set until the stop price reaches the price the stock was when the ProfitLocker™ system stop was initially set, namely, breakeven. The ProfitLocker™ system stop is a ratcheting stop, and the stop will never go lower, only increase. Once the stop reaches breakeven, it will remain there until the stock's price achieves 50% of the Target %. As the stock's price goes above 50% of the Target %, the ProfitLocker™ system will parabolically increase the stop until the profit target is reached. At that point, the stop will be 1% below the profit target, and will continue as a 1% trailing stop.

The ProfitLocker™ system and method as referenced above may be demonstrated graphically as shown in FIGS. 1A and 1B, screen shots from a computer system display of the ProfitLocker™ system. In FIG. 1A, the stock's price is indicated by a solid line, and the stop price is indicated by broken lines. In this example, the ProfitLocker™ system has flexibility based on the Target % and Stop % that the user sets, namely a 50% Target % and a 15% Stop %. Referring to FIG. 1B, there is shown a 100% Target % and a 10% Stop %. Comparing FIGS. 1A and 1B, the period during which the stop is at "breakeven" is much longer in FIG. 1B than in FIG. 1A. This is because the size of the stop when one is 50% of the way to the 100% profit target is much larger than when one is 50% of the way to the 50% profit target.

Referring to FIG. 1C, this example shows a real-world example of how a ProfitLocker™ system stop with a 40% Target % and a 15% Stop % will look if applied to Microsoft (MSFT) on Jun. 16, 2017. The broken lines B are the stop price, and the candles A are the stock's price in an OHLC (open-high-low-close) format. As the stock's price gets nearer to the Target %, the stop price rises. It should be understood that the graph in FIG. 1C can not be generated by the ProfitLocker™ system and is for purposes of illustration.

The ProfitLocker™ system has provided users with excellent results in monitoring a user's stock position over prior art systems. However, there is always room for improvement which is addressed by the present invention and which invention is now available from VectorVest® under the trademark ProfitLocker Pro™ and sometimes referred herein by this brand name.

SUMMARY OF THE INVENTION

A primary object of the present invention is to provide for a system and method (collectively sometimes referred to as "system") for protecting stock market investments.

Another primary object of the invention is to provide a system which allows investors to determine the level of risk to be taken throughout a stock trade as it nears a profit target and beyond.

The present invention includes several distinct facets. For example, a stop price may start out loose until reaching profitability and the system gives a position more room for volatility while maintaining profitability. The system then tightens as the user nears her profit target. The system provides a stop system that can be configured to create a wide variety of stops as seen herein.

The stop system of the invention provides several distinct advantages to users, including the ability to lock in a higher amount of profit from a stock trade. It will, therefore, increase profits of a user's stock portfolio over standard stops available in the market today.

The system of the invention comprises a computer and a computer program having parameters for Target, Stop, and at least one of Greed, End Trail and Transition; entering a percentage for Target, Stop, and at least one of Greed, End Trail and Transition; and wherein the computer program in conjunction with the computer will set a ratcheting stop price for the stock to indicate to a user of the system when the stock should be sold to receive a profit on the sale of the stock.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings.

Referring to the drawings:

FIGS. 1A-1C illustrate examples of the ProfitLocker™ system.

FIGS. 8A and 8B illustrate a comparative example between the ProfitLocker™ system and the system of the present invention.

FIGS. 10A and 10B illustrate a comparative example between the ProfitLocker™ system and the system of the present invention.

FIGS. 12A and 12B illustrate a comparative example between the ProfitLocker™ system and the system of the present invention.

DETAILED DESCRIPTION OF THE PREFERRED EMBODIMENTS

Figure 1B:
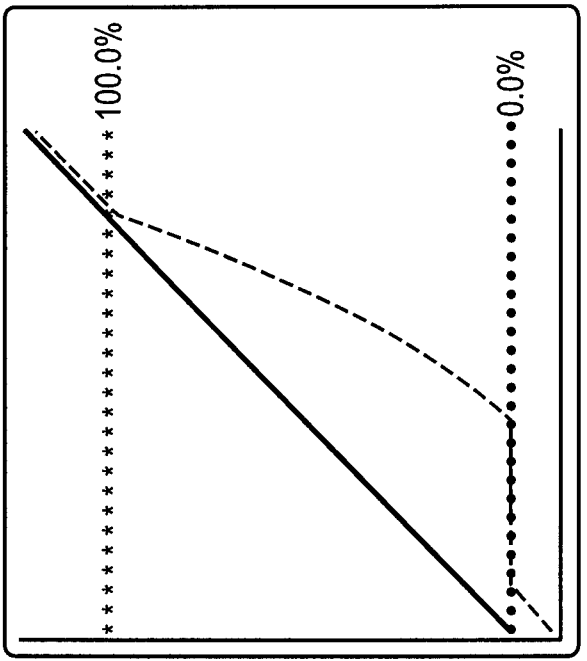

The present invention comprises a system and method for determining when to close a stock market position. It automatically sets a stop price which, if the stock's price falls below this stop price, the stock should be sold. The system and method of the invention may be incorporated via a computer program used on a user's computer system. For example and as discussed below, a user may subscribe to a vendor's Web site to obtain access to a computer program such as the VectorVest® 7 computer program available at the VectorVest® Web site at www.vectorvest.com. The VectorVest® 7 program will include as a feature of the stock trading system the ProfitLocker Pro™ system. The VectorVest® 7 program with the ProfitLocker Pro™ system as of Jan. 3, 2020 is incorporated herein by reference.

The system and method stop tracks a stock's price movement, and as that stock increases in price will either increase the user's stop price, or in some cases keep it the same, to let the user know when it is time to close a stock position. This is unique in that it allows the user to configure the points in the trade to allow for more or less volatility with respect to the stop price. The system and method directed to the stop price for a stock may be driven by at least five user-defined variables, namely, (1) Target; (2) Stop; (3) Greed; (4) End Trail; and (5) Transition. It is understood that the system and method of the invention must use the Target and Stop variables and at least one or more of the Greed, End Trail and Transition variables. Terms used herein to describe the system and method of the invention have the following meanings:

Purchase Price means the price at which a stock is purchased.

Target means a percentage gain in a stock's price selected by a user, e.g. a 50% gain in a stock's price. When the Target is reached, the Stop Movement transitions to a Trailing Stop of End Trail.

Stop means an initial Trailing Stop percentage selected by a user in relation to a Purchase Price of a stock, e.g. 15% of the Purchase Price. This is the maximum amount one can lose on a stock position using a stop of the invention. The terms "stop" and "stop price" as used herein should not be confused with "Stop."

Greed means how close a stock's price needs to get to the Purchase Price before the stop price begins to tighten.

End Trail means a Trailing Stop that the system transitions to once a stock reaches a Target.

Transition means the point at which the system stop price transitions from a standard Trailing Stop to a more Advanced Curve which is expressed as a percentage from the Purchase Price.

Stop Value means a price selected by a user in relation to a Purchase Price at which a stock should be sold if the stock price goes below the stop price.

Stock Movement means the price of a stock as it moves up or down from the Purchase Price until the stock is sold.

Stop Movement means the change in value of a stop price from the date of the purchase of a stock.

Highest Price means the highest price a stock has reached since the Purchase Price.

Trailing Stop means a stop price that is defined as a percentage from a stock's Highest Price since the Stop was set.

Advanced Curve means from the point when the stop price reaches Transition to where the stock price reaches Greed (as a percentage) of the way to Target, the stop price will remain at Transition. Once the stop price reaches Greed X Target, the stop price will parabolically increase until the Target is reached.

Figure 2:
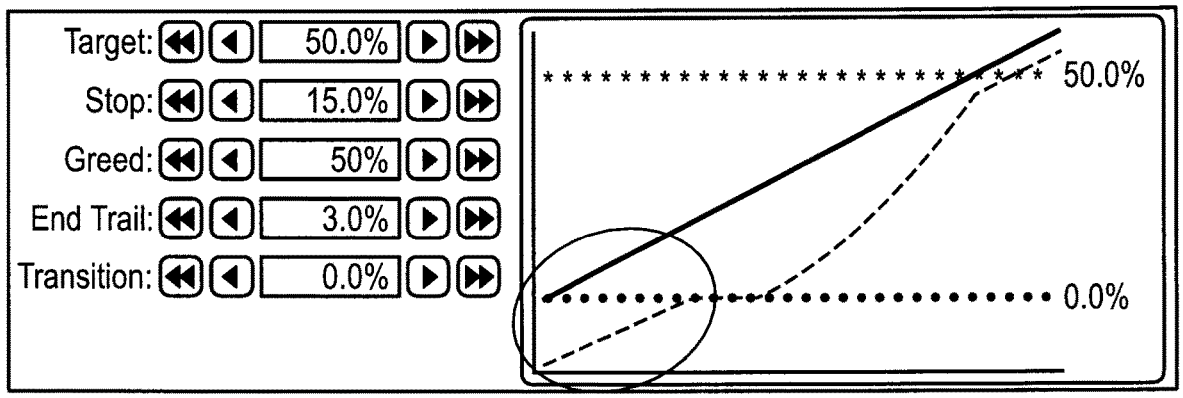
FIGS. 2-5 illustrate examples of the present invention showing the three general phases of the stop price, namely a beginning phase, FIGS. 2 and 3, a middle phase, FIG. 4, and an end phase, FIG. 5.
Figure 3:
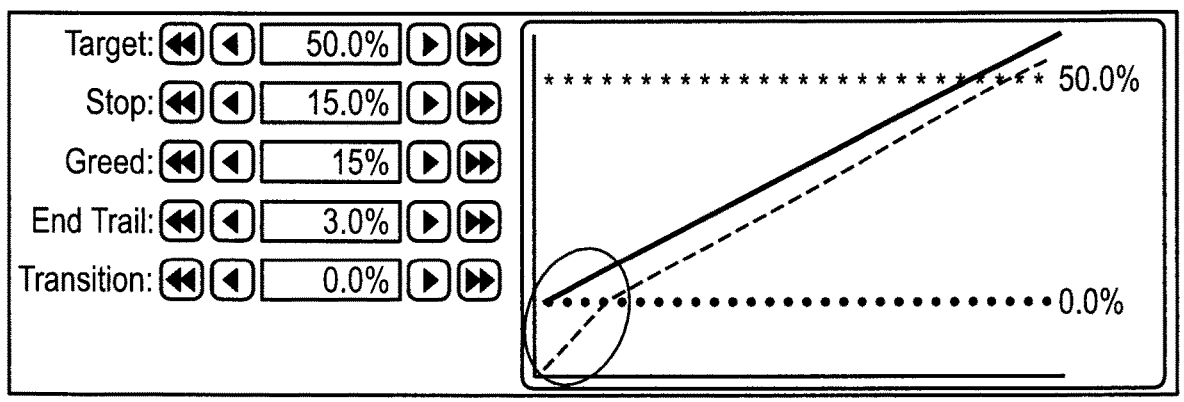

When a user first applies a Stop, the Stop Value=Purchase Price×(1−Stop). Then, until the Stop Value is greater than the Purchase Price, it will trail the user's stock price by the Stop. That means, Stop=Highest Price×(1−Stop) as shown, for example, in FIG. 2. The circled portion in FIG. 2 shows a first phase of the Stop Movement. This is true except in cases where the Greed is exceptionally small. In those cases, the trail will be a straight line from the Stop to the point of Purchase Price×(1+Transition), and the Greed (as %) of the way to Target, as shown in FIG. 3.

Figure 4:
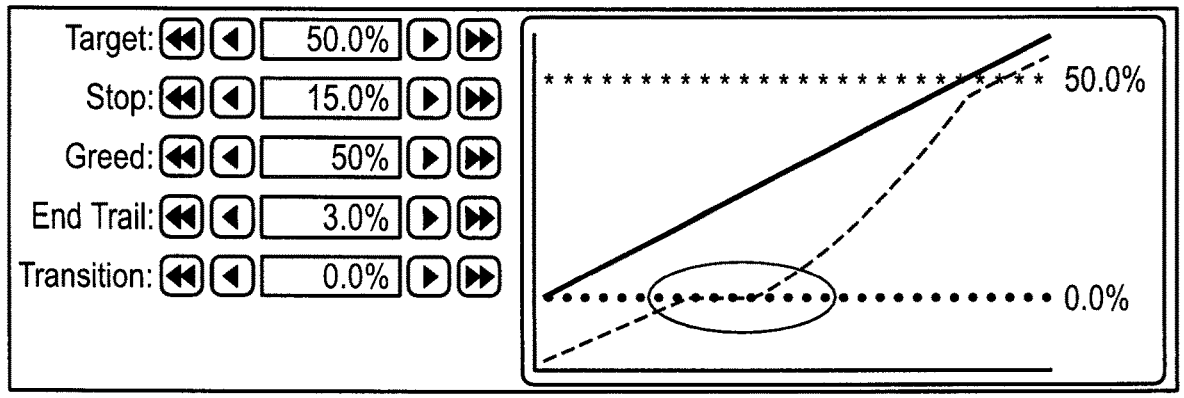
Figure 5:
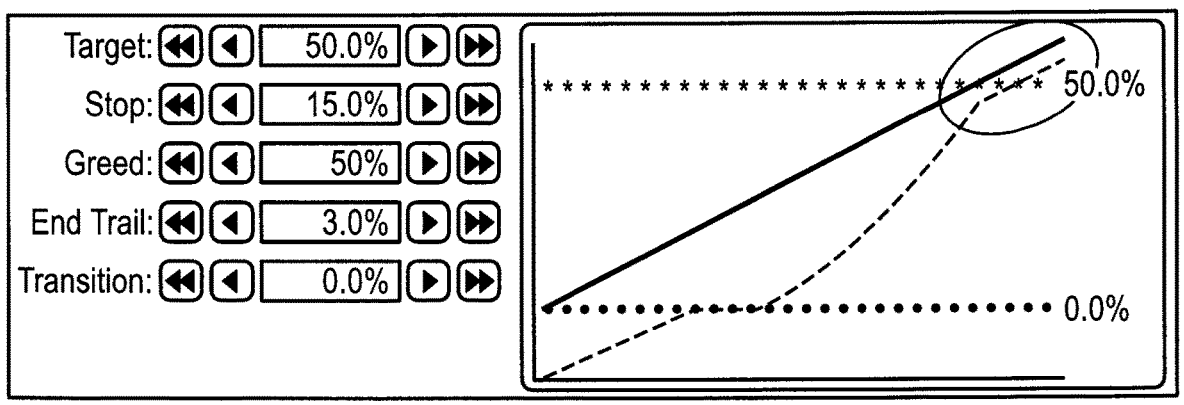

Once Highest Price×(1−Stop)>(Purchase Price×(1+Transition), the stop will stay at its current level until it reaches the point where it should begin tightening as shown in FIG. 4. The circled portion in FIG. 4 shows a second phase of the Stop Movement. This will happen when the stop reaches Greed (as %) to Target. For example, if the Greed is 50%, and the Target is 25%, the stop will begin tightening when one reaches a 12.5% gain. Once this point is reached, the stop will curve towards Target End Trail as shown in the circled portion of FIG. 5 and which is a third phase of the Stop Movement. Once that point is reached, the stop will once again become a Trailing Stop, defined by End Trail. This allows a great deal of flexibility in the stop and a wide variety of stops that may be created.

Figure 6A:
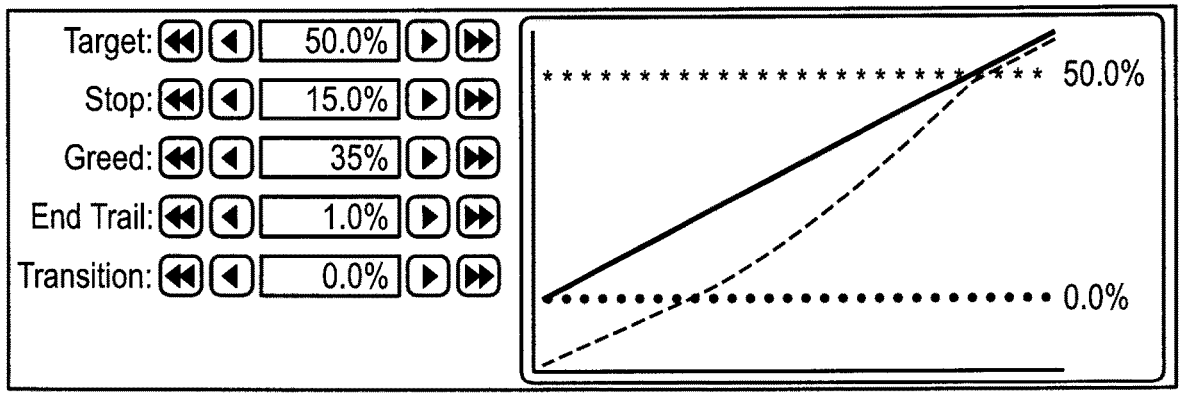
FIGS. 6A-6I illustrate examples of the invention having different percentages for Target, Stop, Greed, End Trail and Transition.

Examples of the system and method are shown in FIGS. 6A-6I wherein the solid line indicates the stock price and the broken lines indicate the Stop Movement. FIG. 6A shows a Target of 50%; a Stop of 15%; a Greed of 35%; an End Trail of 1%; and a Transition of 0%. The solid line indicates the stock price from the Purchase Price to past the Target. The broken lines show Stop Movement and how the stop price transitions from the Stop through the rise of the stock price. Once the Target is reached, the End Trail is at 1% of the stock price. FIG. 6A is a screen display as seen on a user's computer.

Figure 6B:
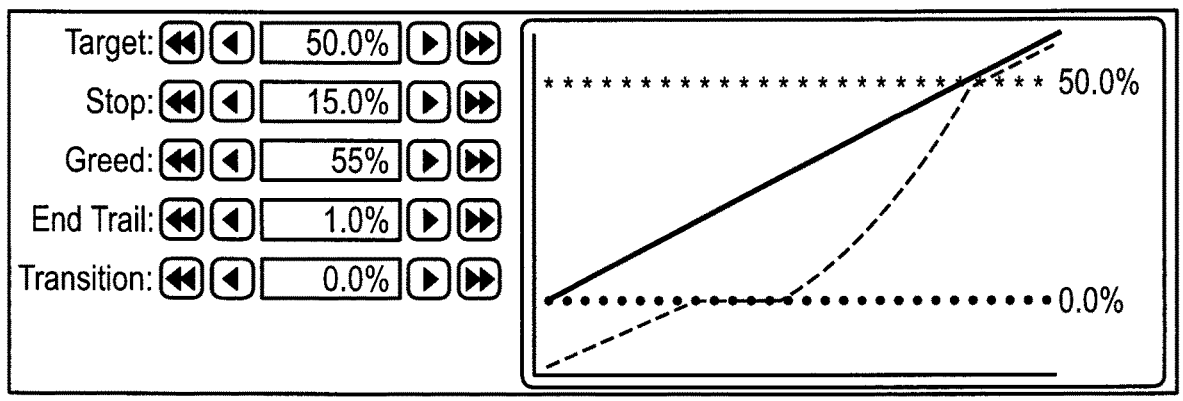
Figure 6C:
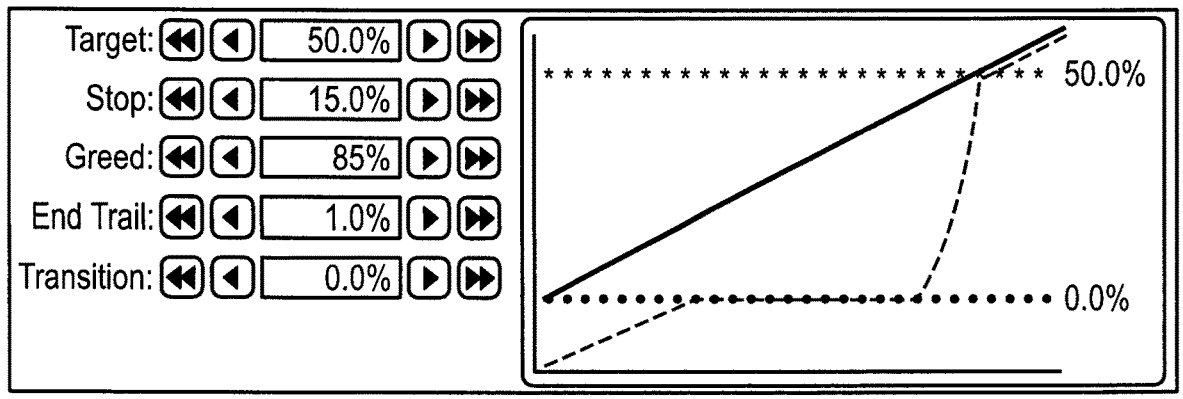

Like FIG. 6A, FIGS. 6B-6I are screen displays illustrating different percentages of Target, Stop, Greed, End Trail and Transition. As seen in FIGS. 6A-6C, with the different percentages of Greed, the stop price stays at break even for a longer period of time reflecting a user's willingness to allow for more volatility in the stock.

Figure 6D:
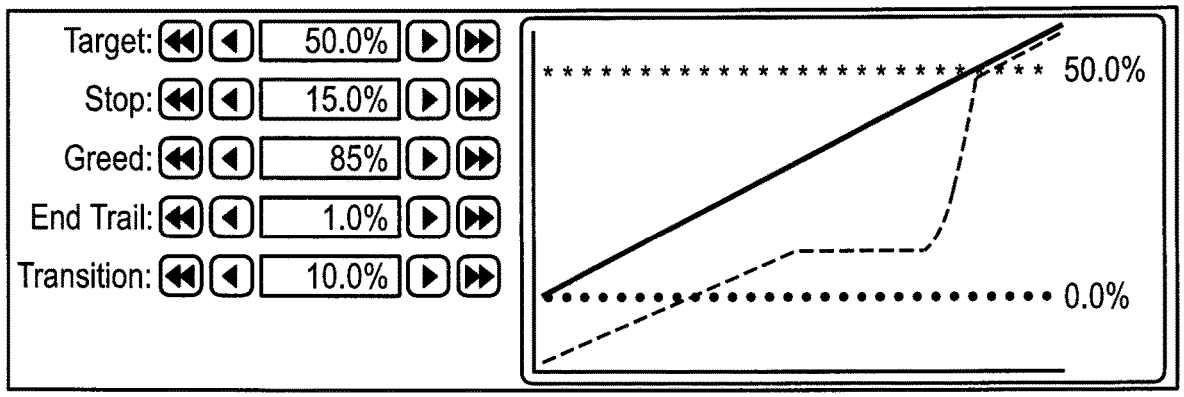
Figure 6E:
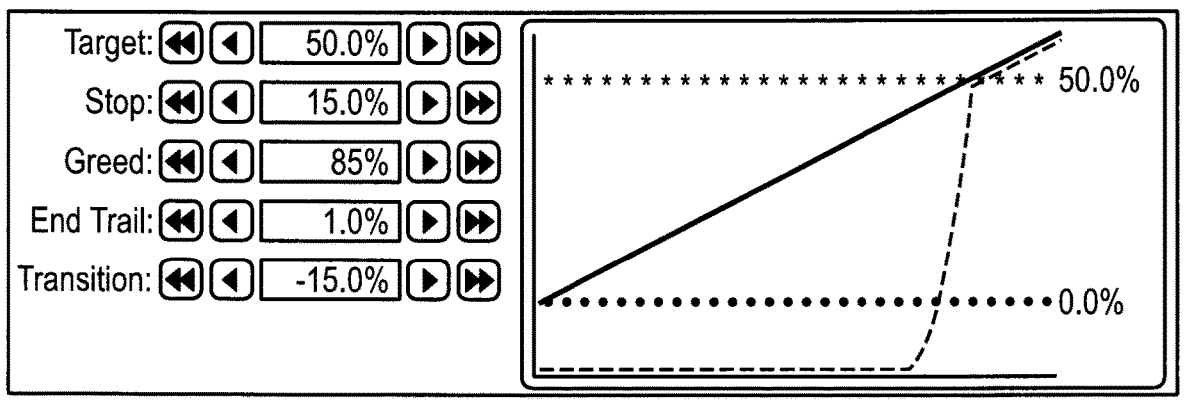
Figure 6F:
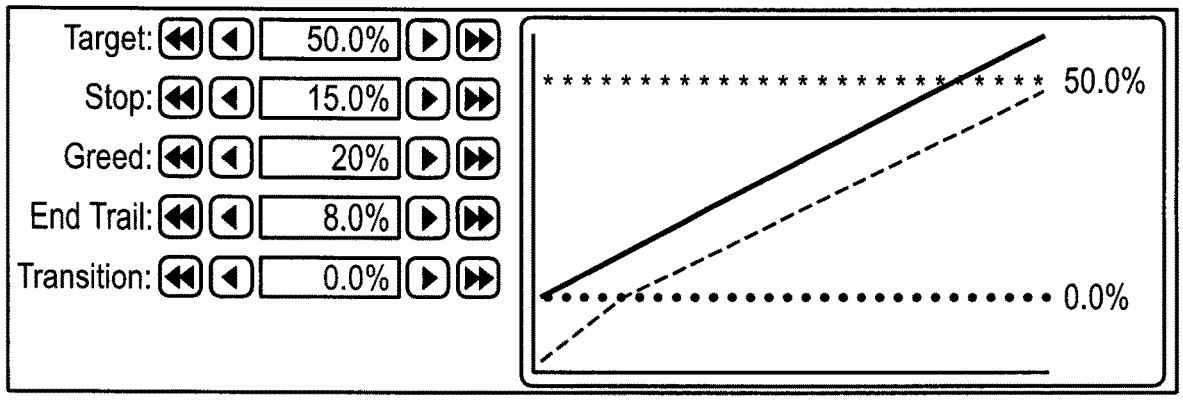
Figure 6G:
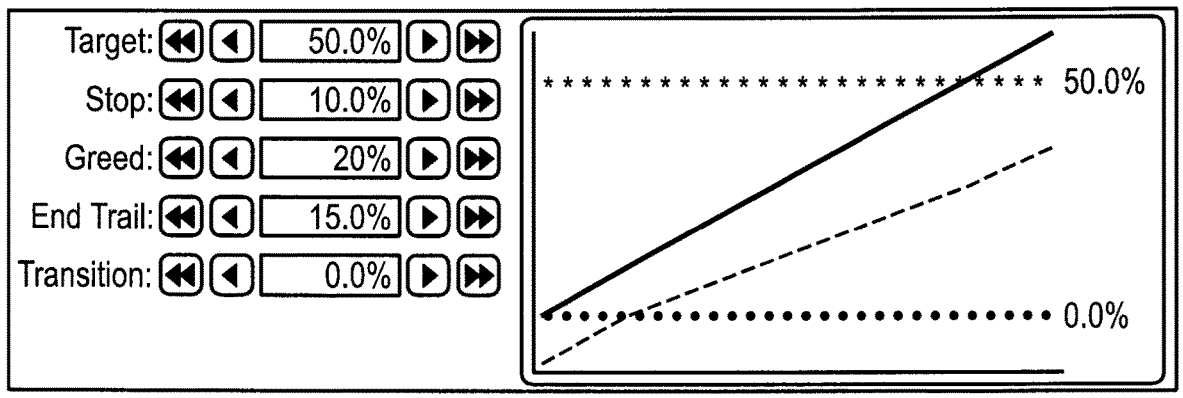
Figure 6H:
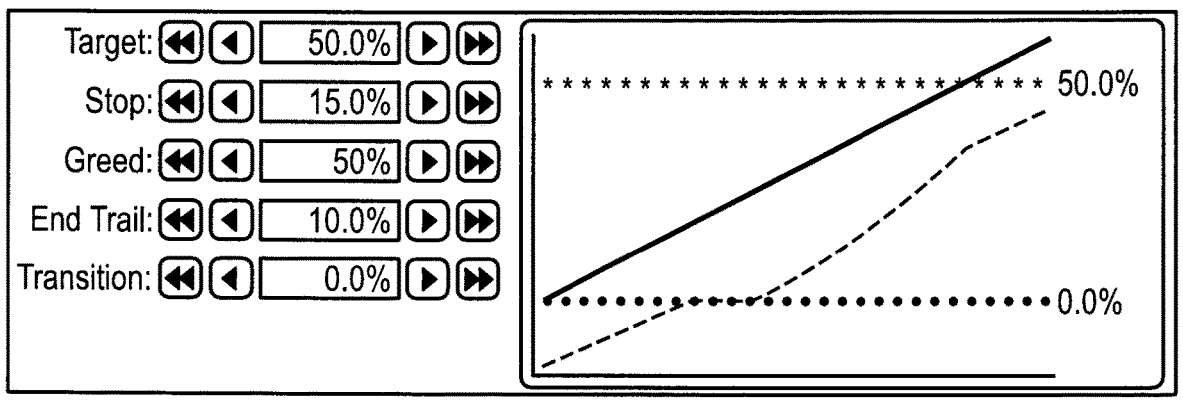
Figure 6I:
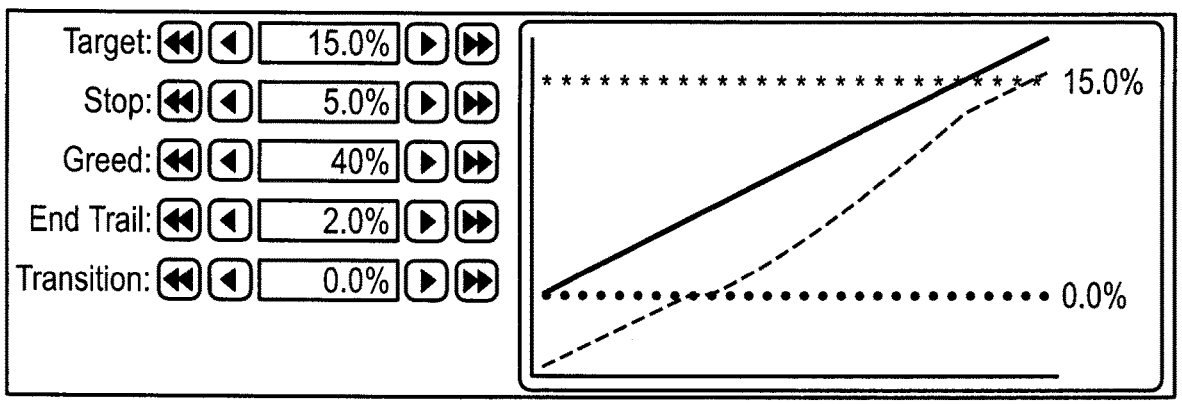

FIGS. 6D and 6E illustrate the effect of the percentage of Transition on the movement of the stop price in relation to the rise in value of the stock. FIG. 6D shows Stop Movement with a 10% transition and there will be less volatility in this stock trade. FIG. 6E shows a −15% Transition and will provide for greater volatility and for a greater risk of loss.

FIGS. 6F-6I further illustrate Stop Movement with different percentages of Target, Stop, Greed and End Trail. Therefore, FIGS. 6A-6I illustrate the different parameters which a user may select in controlling the stop price.

Having defined the invention with respect to the VectorVest® ProfitLocker Pro™ system, an example of the method of use of the system will be generally discussed. This non-limiting example is directed to use of the VectorVest® 7 program. A user goes to the VectorVest® Web site at www.vectorvest.com and logs into the system with a user name and password. The VectorVest® 7 program provides a broad system for trading stock and overseeing a user's stock portfolio. One feature of the VectorVest® 7 program is the ProfitLocker Pro™ system. The system will provide a default setting such as Target 50%; Stop 15%; Greed 50%; End Trail 1%; and Transition 0%. The system will also provide for templates having preselected percentages of Target, Stop, Greed, End Trail and Transition which a user may select. Such templates may include Prudent; Prudent Enhanced; Speculative; Aggressive; and Aggressive enhanced. The percentages of Target, Stop, Greed, End Trail and Transition for these preselected templates are as follows:

Prudent: Target 50%, Stop 15%, Greed 50%, End Trail 1%, and Transition 0%;

Prudent Enhanced: Target 50%, Stop 10%, Greed 40%, End Trail 5%, and Transition 5%

Speculative: Target 100%, Stop 10%, Greed 50%, End Trail 1%, and Transition 0%;

Aggressive: Target 28%, Stop 7%, Greed 50%, End Trail 1%, and Transition 0%; and Aggressive Enhanced: Target 28%, Stop 7%, Greed 35%, End Trail 1%, and Transition 0%.

In another alternative, a user may customize each of the percentages of Target, Stop, Greed, End Trail and Transition to his own choice of percentages, such as shown in FIGS. 6A-6I. The user may set the percentages the same for each stock in the user's portfolio or may set the percentages for each specific stock in the user's portfolio. Once the percentages are selected for a stock, the percentages may be adjusted by the user to different percentages during the course of the user's holding of the stock. The ProfitLocker Pro™ system allows the user to generate a graph illustrating the stock price movement, including in OHLC format, and the Stop Movement according to the percentages. This can be done in real time, intra-day time, daily or at a time set by the user. The user may also reset the percentages to see what the stop price would look like at different percentages during the past performance of the stock. Prior to the present invention, it was not possible for a user to generate such information, all valuable in determining a stock performance and in deciding when to close a stock position.

As seen above, when a stock reaches its Target percentage, the End Trail percentage defines the amount which the stock can decrease in value before the user is suggested that the position should be closed. As apparent, all of the percentages selected for Target, Stop, Greed, End Trail and Transition will depend on the specific stock owned by the user and the user's end parameters in holding a stock. In the preferred embodiment of the invention, a user should select a percentage for each of Target, Stop, Greed, End Trail and Transition. This will provide a user with the most proficient means of controlling a stop price. However, it is understood that a user may only use Target and Stop and optionally use one or more of Greed, End Trail and Transition to obtain benefit of the invention.

Comparative Examples of Results with ProfitLocker™ and ProfitLocker Pro™

The present invention improves upon the ProfitLocker™ system with the addition of at least one or all of the three variables of "Greed," "End Trail," and "Transition."

As referenced above, Greed defines how close a stock's price needs to get to the purchase price before the stop begins to tighten. One can see the additional flexibility Greed gives to a user of the system of the invention in the following examples.

Figure 7A:
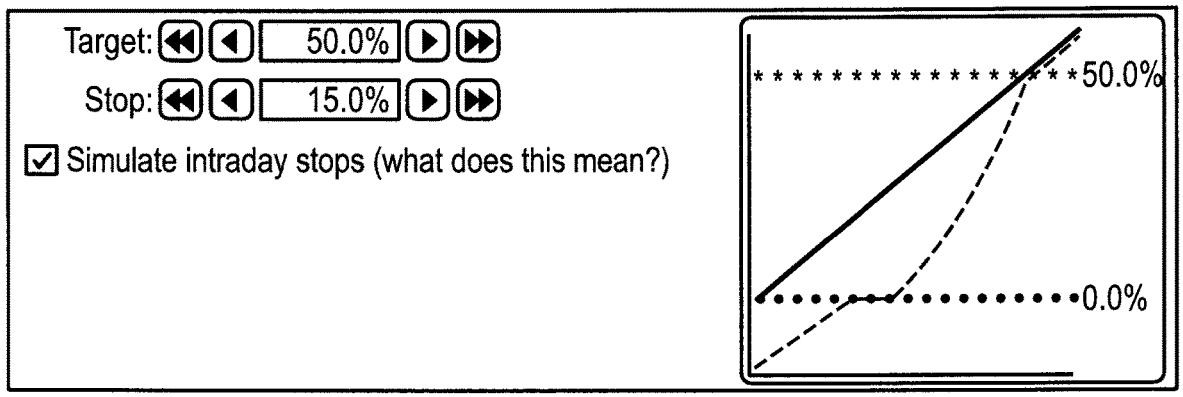
FIGS. 7A-7C provide a comparative example of the ProfitLocker™ system, FIG. 7A, and the system of the present invention, FIGS. 7B and 7C.
Figure 7B:
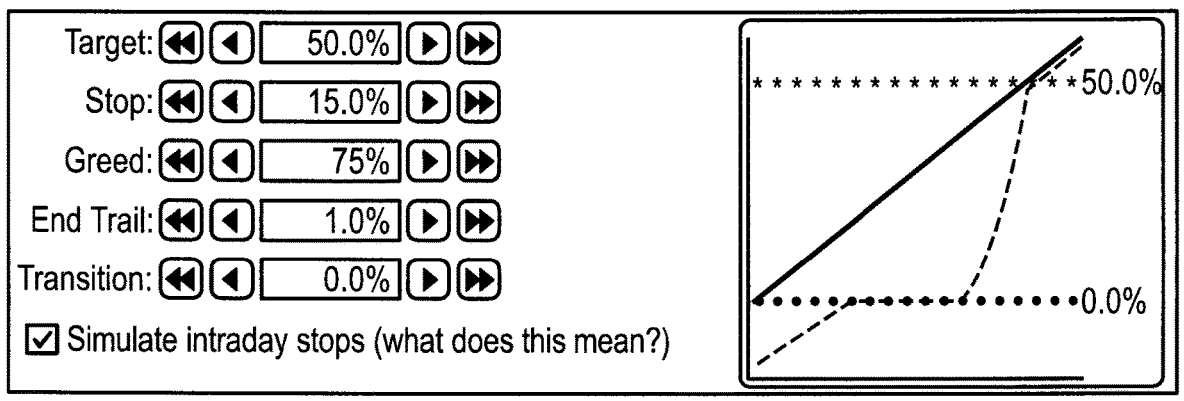
Figure 7C:
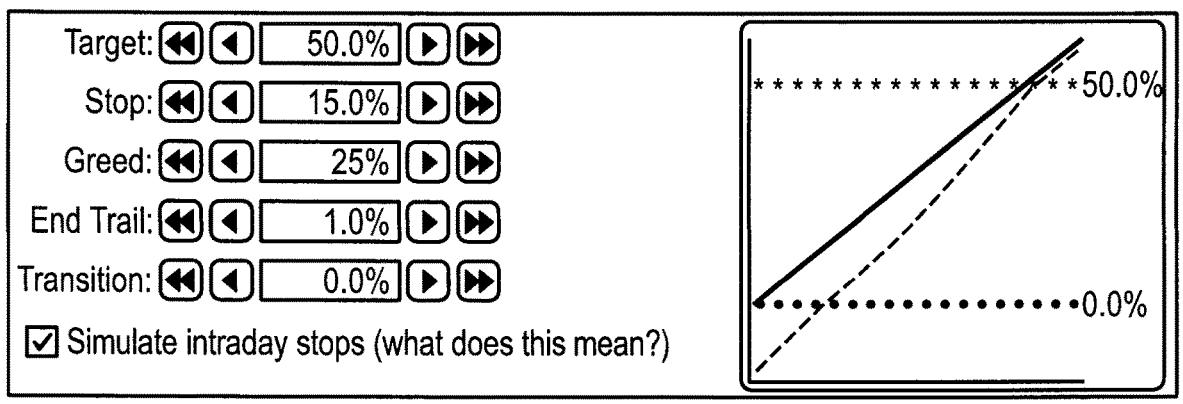

Referring to FIG. 7A-7C, the display screen images show a standard ProfitLocker™ screen display with a 50% Target and 15% Stop. One can see the effect of the invention in FIG. 7B. In this case, the Greed is set to 75%, and one can see that the stop is much wider until the profit target is reached. This gives more room for a stock to move without getting stopped out. Referring to FIG. 7C, one can see a more conservative approach, with a Greed of 25%. In this case, the stop is much tighter.

Figure 8A:
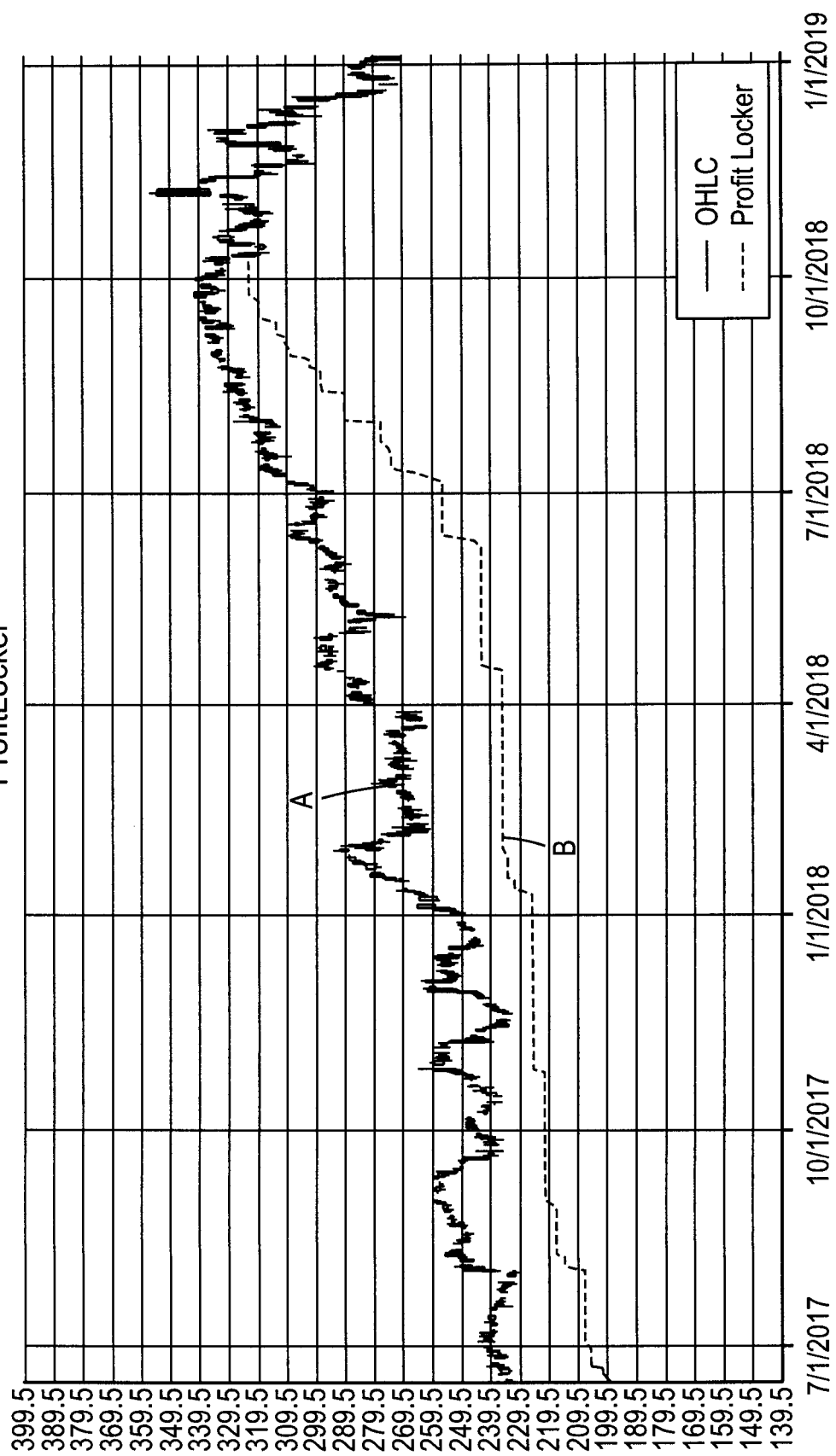

Referring to FIGS. 8A and 8B, the following real-world example shows how the stop would perform, purchasing Humana Inc., HUM, on Jun. 16, 2017 with ProfitLocker™, and then using ProfitLocker™ Pro with 75% Greed. The stop price B is shown in broken lines and the stock price A is shown in candles in OHLC format.

Figure 9A:
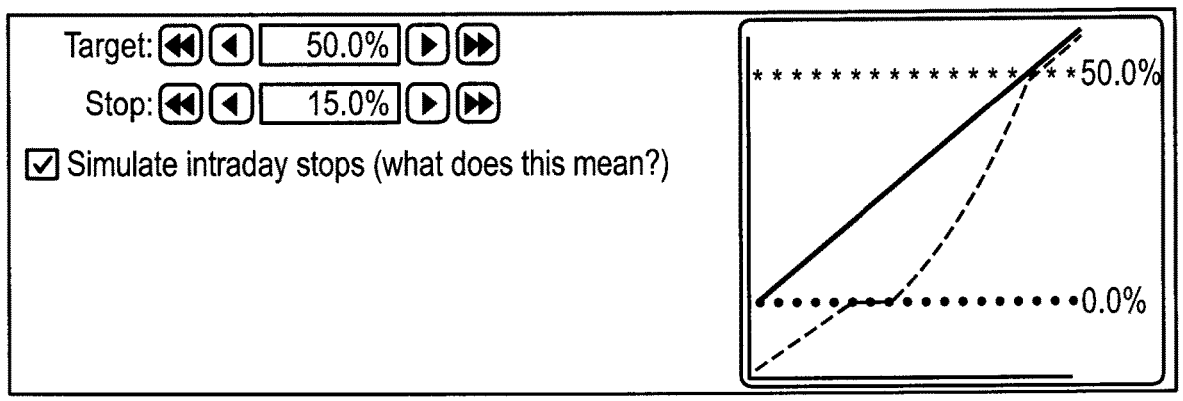
FIGS. 9A and 9B illustrate a comparative example between the ProfitLocker™ system and the system of the present invention.
Figure 9B:
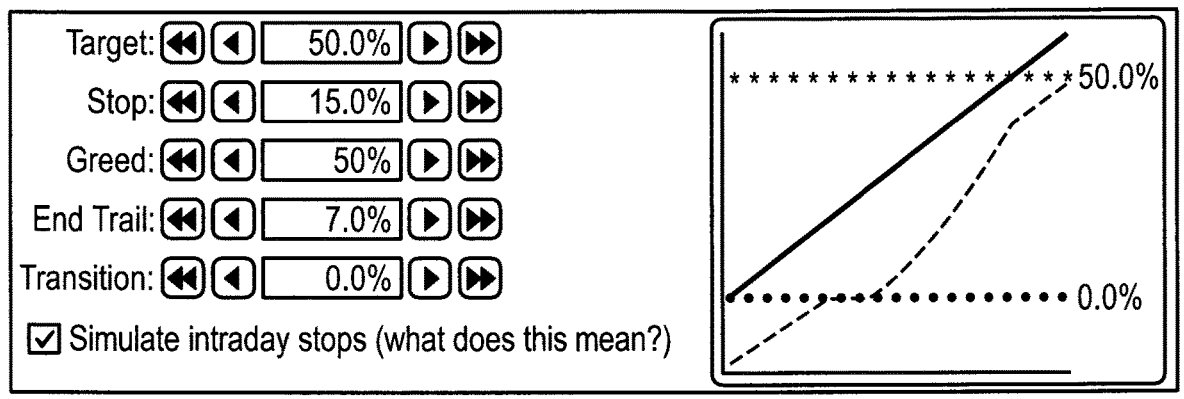

As referenced above, End Trail defines a Trailing Stop that ProfitLocker Pro™ transitions to once a stock reaches its Target. The user can see the additional flexibility that End Trail provides in the following example. Referring to FIG. 9A, this Figure shows a screen display image of ProfitLocker™ with a 50% Target and 15% Stop. One can see the effect of ProfitLocker Pro™ in FIG. 9B with a 7% End Trail. Thus, once the Target is achieved, there is a much larger gap between the stop price and the stock price.

Referring to FIGS. 10A and 10B, the following real-world example shows how the stop would look when purchasing HUM on Jun. 16, 2017 with ProfitLocker™, and then using ProfitLocker Pro™ with a 7% End Trail. The stop price B is shown in broken lines and the stock price A is shown in candles in OHLC format.

Figure 11A:
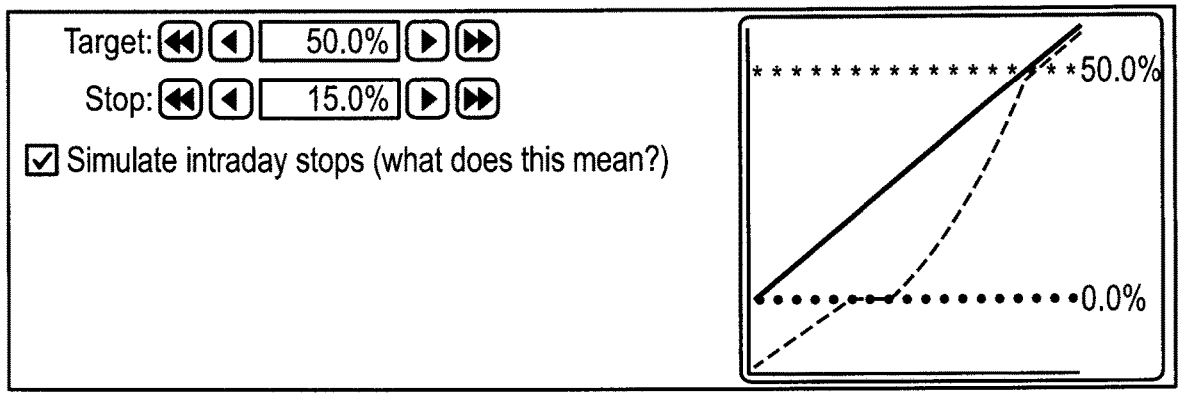
FIGS. 11A-11C illustrate a comparative example between the ProfitLocker™ system, FIG. 11A, and the system of the present invention, FIGS. 11B and 11C.
Figure 11B:
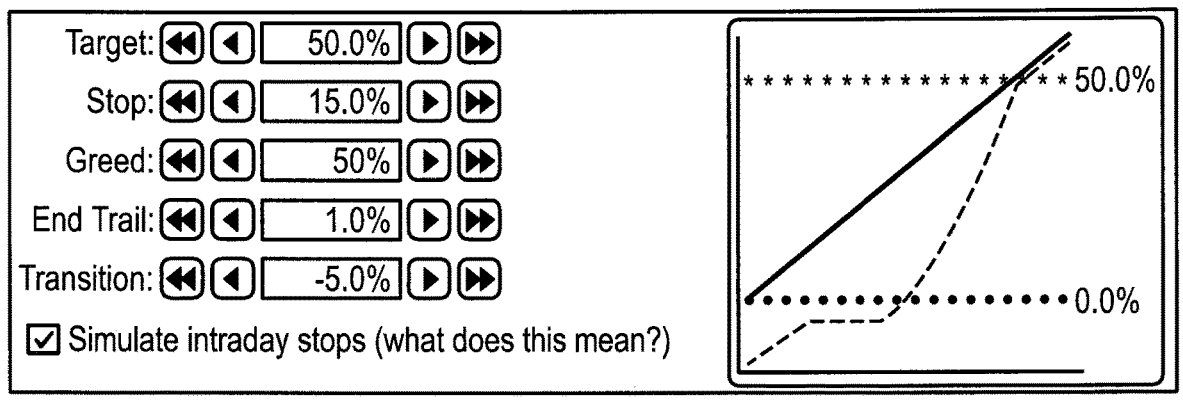
Figure 11C:
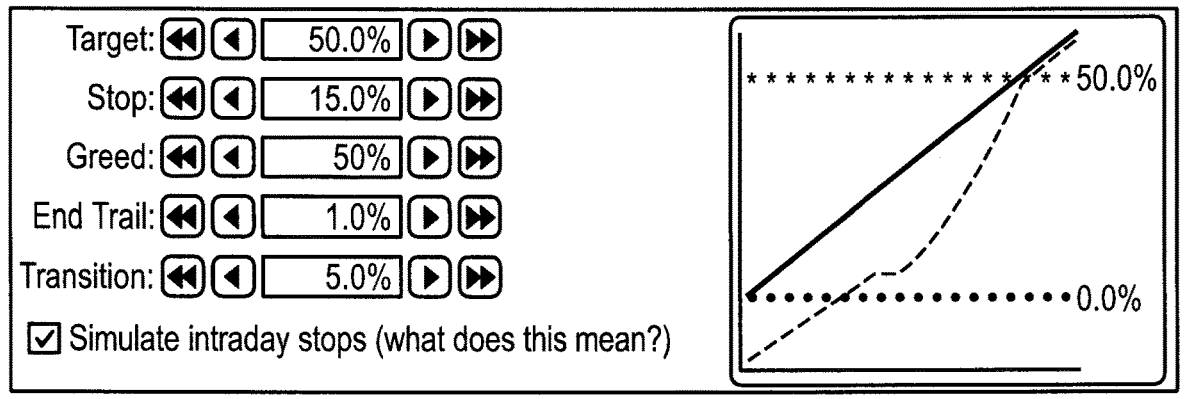

As referenced above, Transition defines the point at which the ProfitLocker Pro™ stop price transitions from a standard trailing stop to the more Advanced Curve of the ProfitLocker Pro™ system. This is expressed as a percentage from the Purchase Price. One can see the additional flexibility the Transition gives in the following example. Referring to FIG. 11A, this Figure shows the ProfitLocker™ system with a 50% Target and 15% Stop. Referring to FIG. 11B, one can see the effect of ProfitLocker Pro™ with a −5% transition. Note that the transition from a ProfitLocker™ system trail to the ProfitLocker Pro™ system curve begins much sooner. Referring to FIG. 11C, one can see the effect of ProfitLocker Pro™ with a 5% transition. Note that the transition from a ProfitLocker™ system trail to the ProfitLocker Pro™ system curve begins much later.

Referring to FIGS. 12A and 12B, the following real-world example shows how the stop price would look, purchasing McDonald's Corp., MCD, on Jun. 16, 2017 with a ProfitLocker™ system, and then using ProfitLocker Pro™ system with a −5% transition. The stop price B is shown in broken lines and the stock price A is shown in candles in OHLC format. The ProfitLocker Pro™ system using the present invention provides the user with more flexibility in adjusting the stop price depending on the stock and the user's willingness to hold the stock.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A system to set a stop price for a stock to protect a user's investment in the stock comprising
   a computer and a computer program having stop price variables for Target, Stop, Greed, End Trail and Transition,
   a user enters into the system a percentage for Target, Stop, Greed, End Trail and Transition,
   the computer program in conjunction with the computer sets a ratcheting stop price for the stock and which tracks the stock's price movement and as the stock increases in price will either increase the user's stop price or keep it the same and letting the user know when it is time to close a stock position,
   the system generates a chart on a computer display screen for the stock which shows Stop Movement in relation to Stock Movement over a preselected period of time and wherein the system generates the chart in real time, and
   the user monitors the ratcheting stop price for the stock on the computer display screen, wherein the user optionally sells the stock when the stop price is reached, thereby protecting the user's investment in the stock, including the ability to lock in a higher amount of profit from a stock trade.

2. The system according to claim 1 wherein the computer program and computer generate a template on the computer display screen wherein the user selects the percentages of Target, Stop, Greed, End Trail and Transition.

3. The system according to claim 2 wherein the template further includes a graph showing Stop Movement in relation to Stock Movement from the Stop to the Target.

4. The system according to claim 1 wherein the computer program and computer generate templates on the computer display screen wherein the user selects the percentage of Target, Stop, Greed, End Trail and Transition selected from the group consisting of a default setting of percentages; templates with preselected percentages; and a template for the customization of the percentages.

5. The system according to claim 1 wherein the user changes the selected percentages during the course of holding a stock.

6. A method to set a stop price for a stock involving a vendor's computer system and a user's computer system wherein the user may log into the vendor's computer system, the method comprising the steps of:
   (a) the user logs into the vendor's computer system,
   (b) the user downloads a computer program from the vendor's computer system,
   (c) the computer program provides for a system which sets a stop price for the stock having stop price variables comprising Target, Stop, Greed, End Trail and Transition,
   (d) the user enters into the system a percentage for Target, Stop, Greed, End Trail and Transition,
   (e) the computer program in conjunction with the computer system sets a ratcheting stop price for the stock and which tracks the stock's price movement and as the stock increases in price will either increase the user's stop price or keep it the same and letting the user know when it is time to close a stock position,
   (f) the system generates a chart on the computer display screen for the stock which shows Stop Movement in relation to Stock Movement over a preselected period of time and wherein the system generates the chart in real time, and
   (g) the user monitors the ratcheting stop price for the stock on the computer display screen, wherein the user optionally sells the stock when the stop price is reached, thereby protecting the user's investment in the stock, including the ability to lock in a higher amount of profit from a stock trade.

7. The method according to claim 6 wherein the computer program and computer system generate a template on the computer display screen wherein the user selects the percentages of Target, Stop, Greed, End Trail and Transition.

8. The method according to claim 7 wherein the template further includes a graph showing Stop Movement in relation to Stock Movement from the Stop to the Target.

9. The method according to claim 6 wherein the user changes the selected percentages during the course of holding a stock.

10. The method according to claim 9 wherein the computer program and computer system generate templates wherein the user selects the percentage of Target, Stop, Greed, End Trail and Transition selected from the group consisting of a default setting of percentages; templates with preselected percentages; and a template for the customization of the percentages.

* * * * *